United States Patent [19]
DiCecco et al.

[11] Patent Number: 6,061,699
[45] Date of Patent: May 9, 2000

[54] METHOD AND COMPUTER PROGRAM PRODUCT FOR EXTRACTING TRANSLATABLE MATERIAL FROM BROWSER PROGRAM FUNCTION CODES USING VARIABLES FOR DISPLAYING MRI

[75] Inventors: Joseph Vincent DiCecco, Rochester; Jason Robert Hansen, Chatfield; Timothy Jude O'Keefe; Devon Daniel Snyder, both of Rochester, all of Minn.

[73] Assignee: International Business Machines Corporation, Armonk, N.Y.

[21] Appl. No.: 08/963,551

[22] Filed: Nov. 3, 1997

[51] Int. Cl.[7] ............................. G06F 9/44; G06F 9/445
[52] U.S. Cl. ........................................... 707/513; 395/701
[58] Field of Search .................................... 707/513, 501, 707/536, 530, 500, 526; 709/201, 200, 203, 701, 702; 395/703–707, 702; 345/214, 357

[56] References Cited

U.S. PATENT DOCUMENTS

| | | | |
|---|---|---|---|
| 5,432,903 | 7/1995 | Frid-Nielsen | 395/161 |
| 5,675,818 | 10/1997 | Kennedy | 395/758 |
| 5,715,466 | 2/1998 | Flannagan et al. | 395/755 |
| 5,796,393 | 8/1998 | MacNaughton et al. | 345/329 |

*Primary Examiner*—Joseph H. Feild
*Assistant Examiner*—Alford W. Kindred
*Attorney, Agent, or Firm*—Joan Pennington

[57] ABSTRACT

A method, apparatus and computer program product are provided for extracting translatable material or Machine Readable Information (MRI) from browser program function codes in a computer system. A browser window is partitioned into frames. The browser window frames include a parent frame. A plurality of variables are created in the parent frame. Each of the plurality of variables defines an MRI string. Then the variables are used in the browser program function codes for displaying MRI.

7 Claims, 9 Drawing Sheets

METHOD AND COMPUTER PROGRAM PRODUCT FOR EXTRACTING TRANSLATABLE MATERIAL FROM BROWSER PROGRAM FUNCTION CODES USING VARIABLES FOR DISPLAYING MRI

FIELD OF THE INVENTION

The present invention to the data processing field, and more particularly, relates to a method, apparatus and computer program product for extracting translatable material from browser program function codes.

DESCRIPTION OF THE RELATED ART

Software is often developed to support multiple national languages. When this is the case it is important to separate translatable material in the user interface such as screens, messages, and help text, hereafter referred to as Machine Readable Information (MRI) from the actual program components. This separation is necessary in order to provide efficient software service. If a program fix impacts a component which also includes MRI, the fixed version of that component must go through a language translation process for each national language supported. Each version of the component must then be maintained and distributed by a service mechanism.

To avoid this complicated and costly problem most development environments today allow programmers to easily separate program function codes and MRI so that only one version of a program component need be fixed and distributed. However, scripting languages, such as VBScript and JavaScript, used in conjunction with web browsers to enhance the presentation of a web page, do not have an easy way to separate MRI from the browser program function codes, such as JavaScript code.

There are two related problems to solve with JavaScript. First, there is a Hypertext Markup Language (HTML) and JavaScript separation problem. JavaScript code is included in HTML files. The HTML files need to be translated since they are the user interface screens. So scripts need to be removed from the HTML panels they support, yet still be available to the panels.

Second, there is a JavaScript code/MRI separation problem. JavaScripts may need to present MRI such as conditional pieces of a web page or error messages to the user. For example, it is common to write a JavaScript function to validate user-provided data on a web page. If there is a problem with the data, the JavaScript can display an error message. The problem is that the error message is usually defined together with the rest of the script. For example, something like the following function would run when the user presses a submit button on a web page.

```
function validateInput(form) {
    if(form.userInput.value == null) {
        alert("Please enter some input.")
        return false
    }}
```

If function validateInput( ) needed to be fixed because of some programming error, the fixed version would have to be translated and distributed separately in each national language since the MRI string 'Please enter some input' is part of the function.

A need exists for a method that overcomes some JavaScript and HTML limitations and that efficiently and effectively facilitates extracting translatable material or MRI from browser program function codes. As used in the following description and claims, the term browser program function codes includes, but is not limited to, browser scripting languages.

SUMMARY OF THE INVENTION

Important objects of the present invention are to provide a method, apparatus and computer program product for extracting translatable material or Machine Readable Information (MRI) from browser program function codes; to provide such method, apparatus and computer program product substantially without negative effect; and provide such method, apparatus and computer program product that overcome many of the disadvantages of prior art arrangements.

In brief, a method, apparatus and computer program product are provided for extracting translatable material or Machine Readable Information (MRI) from browser function program function codes in a computer system. A browser window is partitioned into frames. The browser window frames include a parent frame. A plurality of variables are created in the parent frame. Each of the plurality of variables defines an MRI string. Then the variables are used in the browser program function codes for displaying MRI.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
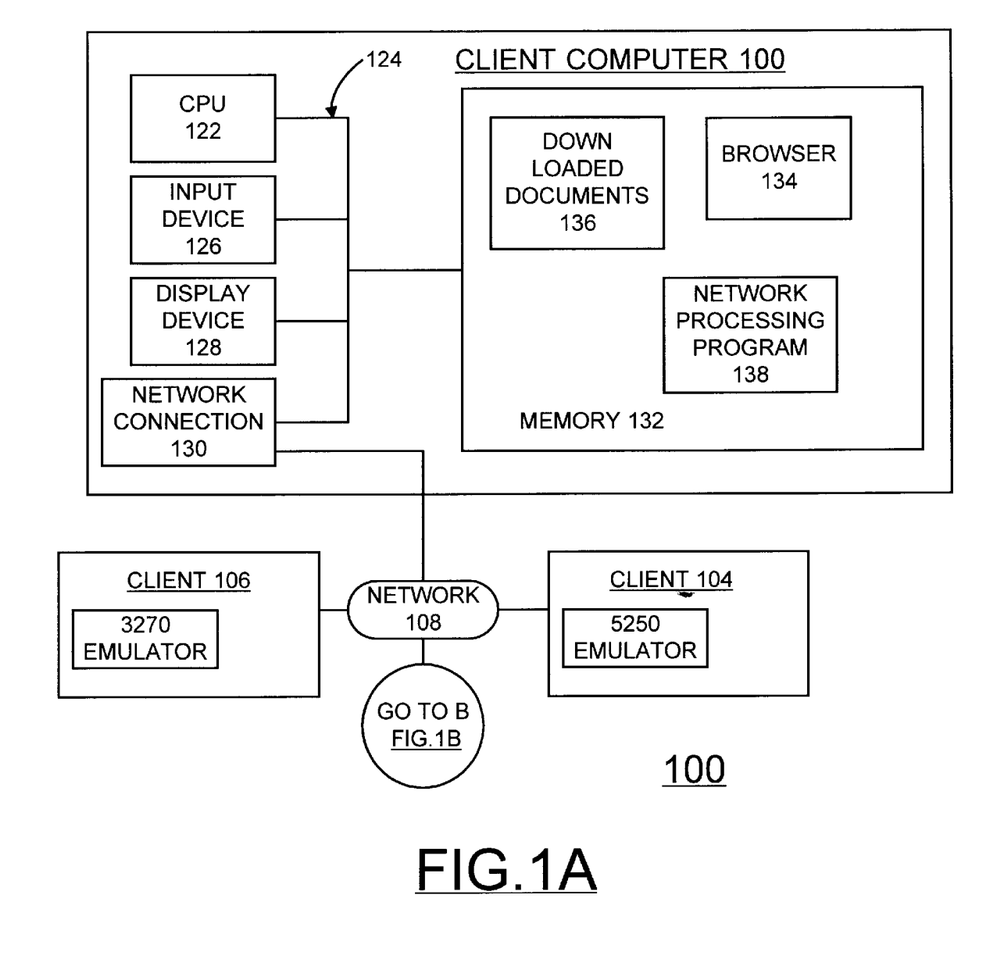
FIGS. 1A and 1B together provide a block diagram representation illustrating a computer system for implementing a method for extracting translatable material from browser program function codes in accordance with the preferred embodiment.
Figure 1B:
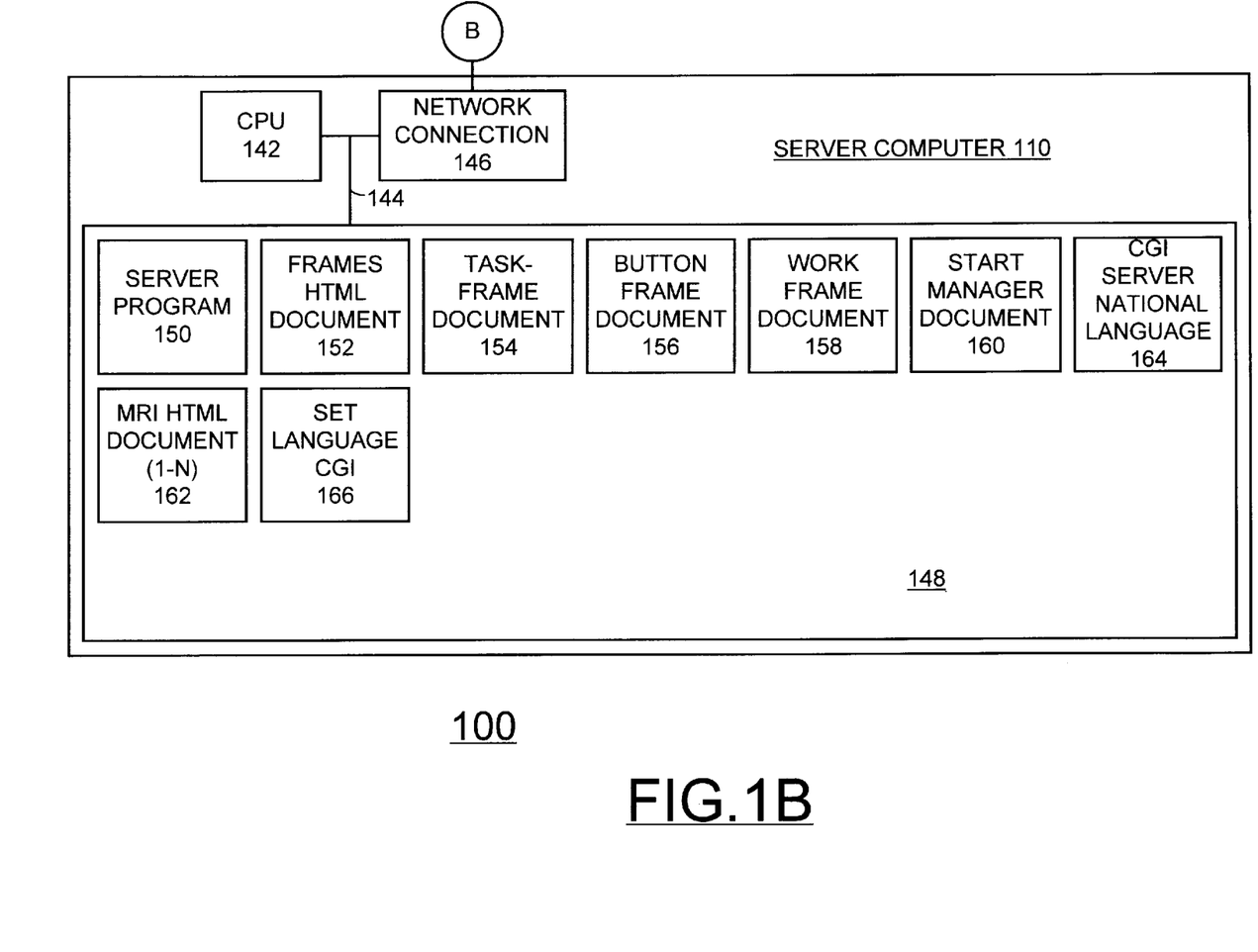

Having reference now to the drawings, in FIGS. 1A and 1B, there is shown a block diagram of a data processing or computer system in which a preferred embodiment may be implemented generally designated by the reference character 100. As shown in FIGS. 1A and 1B, computer system 100 includes a plurality of client computers 102, 104, 106 connected via a network 108 to server computer 110. Computers 102, 104 and 106 functioning as clients are shown. In the preferred embodiment, network 108 is the Internet, although it could be another kind of network such as a Local Area Network (LAN) or an Intranet.

Client computer 102 contains a central processing unit (CPU) 122, which is a processor connected via bus 124 to an input device 126, a display device 128, a network connection 130, and a memory 132. Client computer 104 contains a 5250 emulator, and client computer 106 contains a 3270 emulator. "5250" and "3270" designate different types of display terminals that support different protocols for connecting to a server computer. Thus, a 5250 emulator is a program that emulates the actions of a 5250 display terminal on client computer 104. Analogously, a 3270 emulator is a program that emulates the actions of a 3270 display terminal on client computer 106. Thus, these emulators give client computers 104 and 106 the appearance to server 110 of being the respective type of display terminal. Although client computers 102, 104, and 106 are shown as being different computers, they actually all could be the same computer; for example, client computer 102 could run both a 3270 emulator and a 5250 emulator.

Input device 126 can be any suitable device for the user to give input to client computer 102; for example: a keyboard, key-pad, light-pen, touch-screen, button, mouse, trackball, or speech-recognition-unit could be used. Display device 128 could be any suitable display device, such as a display screen, television set, or operator panel. Although input device 126 is shown as being separate from display device 128, they could be combined; for example: a display with an integrated touchscreen or a display with an integrated keyboard.

Memory 132 is storage sufficiently large to hold the necessary programming and data structures. While memory 132 is shown as a single entity, memory 132 may in fact comprise a plurality of storage devices, and that memory may exist at multiple levels, from high-speed registers and caches to lower speed but larger DRAM chips, to floppy-disk drives, fixed-disk drives, tape drives, CD-ROM drives, or optical drives. Memory 132 can be loaded and stored between its various levels as needed. While memory 132 is shown as existing entirely in client computer 102, memory 132 may in fact be remote memory that exists anywhere in network 108 or in a Local Area Network, not shown.

Memory 132 contains a browser 134 arranged in accordance with the preferred embodiment, downloaded documents 136, and a network-processing program 138. Browser 134 can download documents from server 110 to downloaded documents 136 in memory 132 and operate on these downloaded documents in accordance with the preferred embodiment. Although downloaded documents 136 is drawn as a single entity, it may in fact exist as multiple entities. When the discussion below refers to browser 134 executing functions in documents from the server 110, it should be understood that browser 134 is actually operating on the copy of these documents that exists in downloaded documents 136.

Network-processing program 138 contains instructions that, when executed on CPU 122, provide support for connecting client computer 102 to computers in network 108 such as server computer 110.

CPU 122 is suitably programmed by browser 134 interpreting control-codes and scripts, to browse documents such as downloaded documents 126. In the alternative, the function of browser 120 could be implemented by control circuitry through the use of logic gates, programmable-logic devices, or other hardware components in lieu of a processor-based system.

In the preferred embodiment, network connection 108 is a TCP/IP network connection, although it could be any type of suitable network connection. Client computers 102, 104, and 106 are connected to network 108 and ultimately to server computer 110 via telephone lines, cable lines, or by wireless communications. Although client computers 102, 104, 106, and server computer 110 are shown as being separate entities from network 108, they could, in fact, be part of network 108.

Server computer 110 contains a Central Processing Unit (CPU) 142 connected via bus 144 to a network connection 146 and a memory 148. Network connection 146 connects server computer 110 to network 108. Memory 148 contains a server program 150, multiple Hypertext Markup Language (HTML) documents, such as, a frames HTML document 152, a task-frame document 154, a button frame document 156, a work frame document 158, a start manager document 160, an MRI HTML document (1–N) 162; and multiple Common Gateway Interface (CGI) programs such as, a CGI to identify a server national language 164, a set different user national language CGI 166, and a start manager CGI 168. CGI programs are programs invoked on server 110 to process an HTML form when it is submitted from the client 102 to server 110. The operation of these various CGI programs is further described under the description for FIGS. 2A, 3, 4, 5, and 6.

Server program 150 contains computer executable instructions that, when executed on CPU 142, provide support for connecting server computer 110 to network 108 via network connection 146 and responding to requests from client computer 102. In the preferred embodiment, server program 150 supports Hypertext Transport Protocol (HTTP).

Although only one server computer 110 is shown in FIGS. 1A and 1B, there may actually be a multiplicity of server computers. Although server computer 110 is shown as being directly connected to network 108 via network connection 146, it could be connected indirectly such as via a Local Area Network, not shown.

Client computer 102 may be implemented using any suitable client computer, such as an IBM personal computer running the OS/2® operating system. Client computer 102 could be connected directly to network 108 via network connection 130 or could be connected indirectly, such as via a Local Area Network, not shown.

Server computer 110 may be implemented using any suitable server such as the AS/400® computer system, running the OS/400® operating system, both products of International Business Machines Corporation, located in Armonk, N.Y.

Client computers 102, 104, 106 and server computer 110 could be other types of computer systems, whether they be microcomputers such as an Apple Macintosh or mainframe computers such as an IBM System/390, and still fall within the spirit and scope of this invention. In addition, client computers 102, 104, 106, and server computer 110 could be microcomputers such as described above but connected to a larger computer system. Client computers 102, 104, and 106 could also be a computer such as an Internet appliance or thin client that does not have a fixed disk drive. It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, it should be understood that the invention is not limited to the particular hardware designs, software designs, communications protocols, performance parameters, or application-specific functions disclosed herein.

FRAMES HTML document 152 contains control-codes to partition the browser window into frames. MRI HTML document (1–N) 162 contains messages and text labels or MRI strings in all national languages (1–N). Although FRAMES HTML document 152 and MRI HTML document (1–N) 162 are shown as being contained in server computer 110, either could be on any server in network 108. Frames HTML document 152 is further described below with respect to FIGS. 2A and 2B.

In accordance with features of the preferred embodiment, an enhanced document browsing method, apparatus and computer program product are provided for extracting translatable material or MRI from browser program function codes. When the browser 134 is partitioned into separate frames, there is a separate object called the parent window which contains scripts and variables which is made available to any web page rendered in any of the browser frames. All of the JavaScripts to be used are copied in the parent FRAMES.HTM document used to set up the frames. When a function needs to be called by a document in a frame, it only needs to qualify the location of the function in order to use it, for example, parent.validateInput(form). In accordance with the preferred embodiment, the parent FRAMES.HTM document does not contain any HTML which must be translated, this file is a code-only part and can be fixed and distributed without translation.

The browser program function codes, such as, JavaScript code and the MRI separation problem is solved by the browser method of the preferred embodiment. All MRI used by JavaScript functions advantageously is defined as a series of text (string) variables. These variables are placed in the separate MRI HTML document (1–N) 162. A MRI load function is used to load an appropriate national language version (1–N) of the MRI HTML document 162 into a parent task frame when the frames are initialized. This MRI file 162 need not have any visible content, just the MRI load function; and it would be translated into any language necessary. The MRI HTML document 162 is defined to run the MRI load function as soon as it has loaded into the frame. The MRI load function then creates a variable at the parent window level for each MRI string. These remain in the browser's memory as long as the framed document is loaded, and they are available to any script functions executing in any frame. When functions need to display some MRI, a variable name is used instead of the actual string. For example, the above described script function, validateInput( ) is given by:

```
function validateInput(form) {
    if (form.userInput.value == null) {
        alert ( parent.noInputMessage)
        return false
}}
```

In the MRI document's MRI load function, the following line of code is used to define the value of noInputMessage:

parent.noInputMessage="Please enter some input."

After the MRI load function has completed, the frame that has been used for the MRI document can be reloaded with a visible document making up part of the internet application being provided.

Referring now to FIGS. 2A, 2B, and 3–6, there are shown exemplary sequential steps in accordance with the enhanced document browsing method, apparatus and computer program product of the preferred embodiment. From the browser 134, a user requests a uniform resource locator (URL) that loads an HTML document called FRAMES.HTM as indicated at a block 202 in FIG. 2A. FRAMES.HTM is served by the web server 110 and loaded by browser 134 and the browser parent window is partitioned into three frames as indicated at a block 204 in FIG. 2A. This FRAMES.HTM document 152 contains all the browser script function codes or JavaScript functions to be used by all subsequent HTML documents. These JavaScript functions stay in memory 132 as long as FRAMES.HTM is loaded in the browser 134.

Figure 2A:
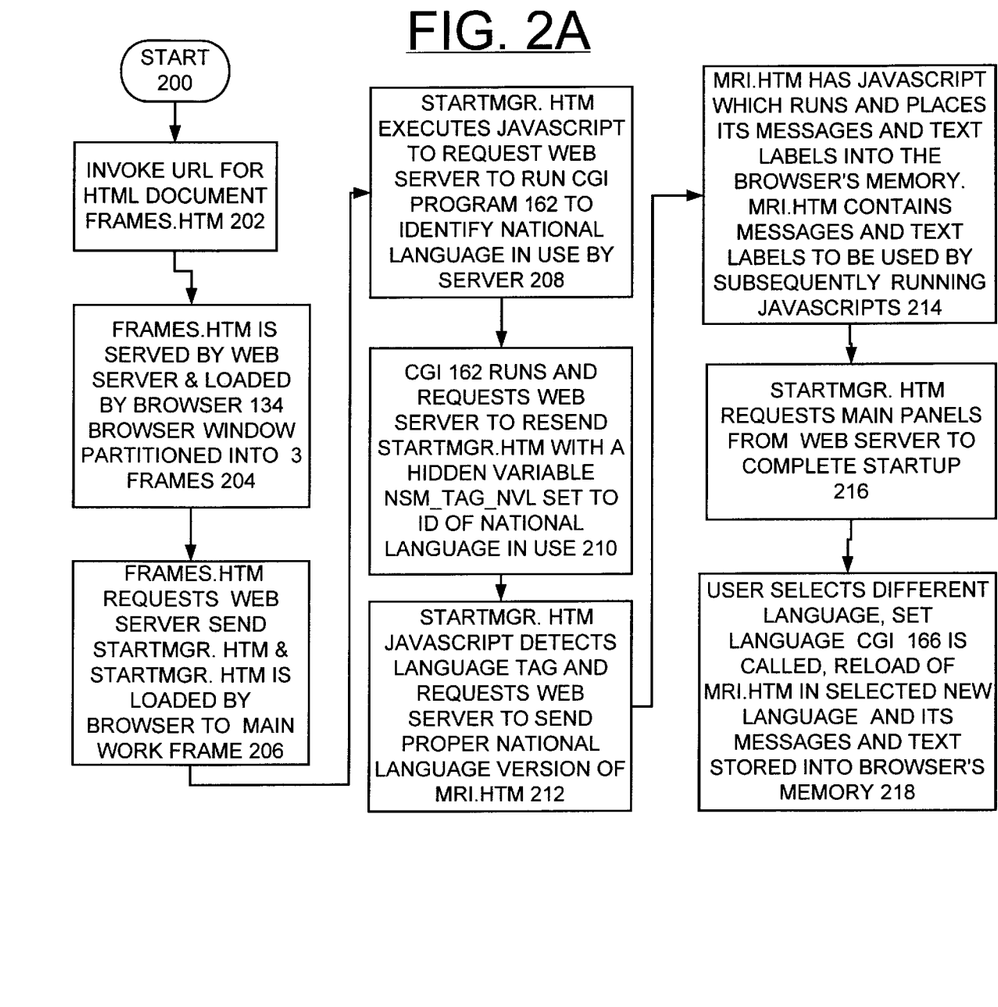
FIG. 2A is a flow diagram illustrating sequential steps for extracting translatable material from browser program function codes in accordance with the preferred embodiment.
Figure 2B:
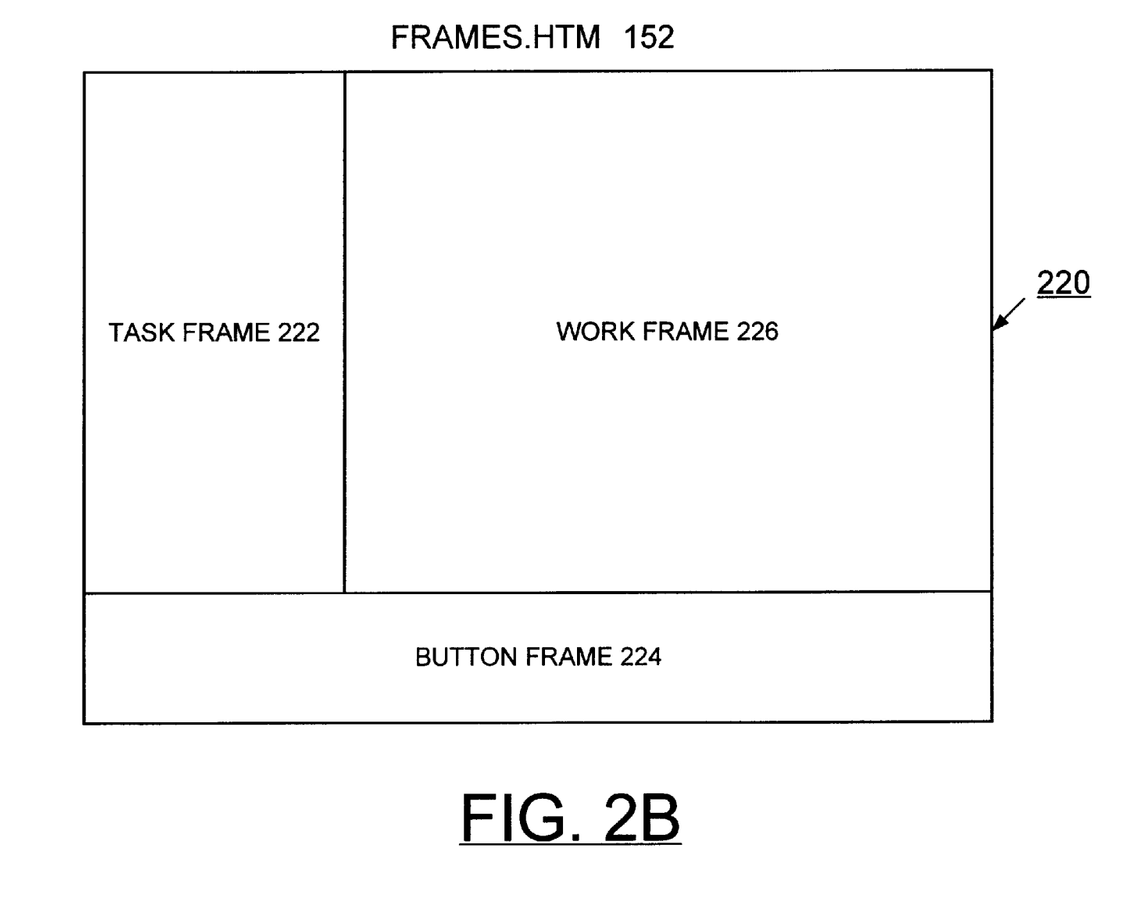
FIGS. 2B, 3, 4, 5, and 6, are diagrams respectively illustrating sequential steps for extracting translatable material from browser program function codes in accordance with the preferred embodiment.

Referring to FIG. 2B, FRAMES.HTM 152 also contains frame-setting HTML statements which partition the browser window into the three frames including Task Frame 222, Button Frame 224 and Work Frame 226. Task Frame 222 contains controls allowing the user to select a task to perform, Work Frame 226 contains the information and controls needed to perform a selected task, and Button Frame 224 contains global action buttons, for example, "Back," "Next," "Finish," and "Help"). A sample of the HTML included in FRAMES.HTM appears in TABLE 1 set forth below. TABLE 1 shows excerpted sections of JavaScript functions and the frame setting HTML statements.

Figure 3:
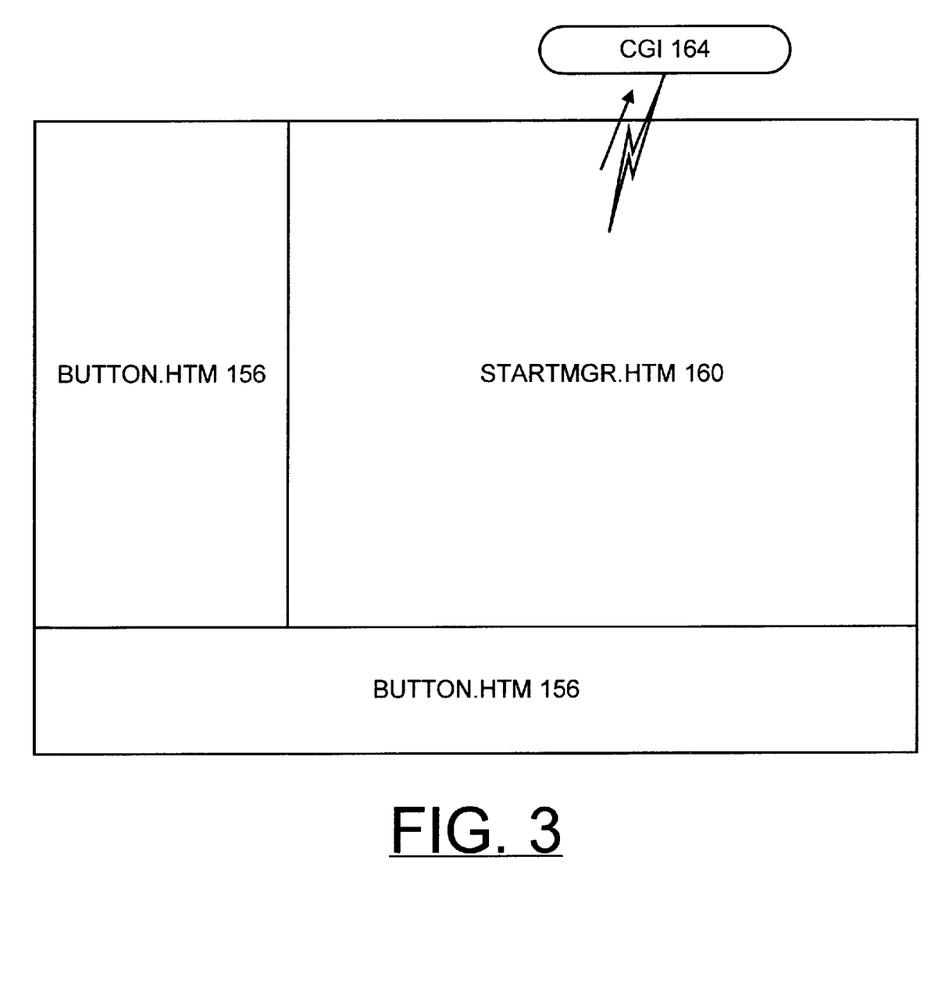

Referring to FIG. 3, after FRAMES.HTM partitions the empty browser window into the three frames illustrated in FIG. 2B, then FRAMES.HTM requests the web server 110 to put documents into its frames. TABLE 1 shows that BUTTON.HTM 156 is loaded into Task Frame 222 and Button Frame 224 and STRMGR.HTM is put into Work Frame 226 as indicated at a block 206 in FIG. 2A. BUTTON.HTM 156 has no content except a request to set the frame's background color to white. STARTMGR.HTM is an HTML document also without visible content, but it has an onload statement which requests that a JavaScript function, loadlogon( ), be run as soon as it is loaded. That function makes a request to the web server 110 to run a CGI program 162 as indicated at a block 208 in FIG. 2A.

Figure 4:
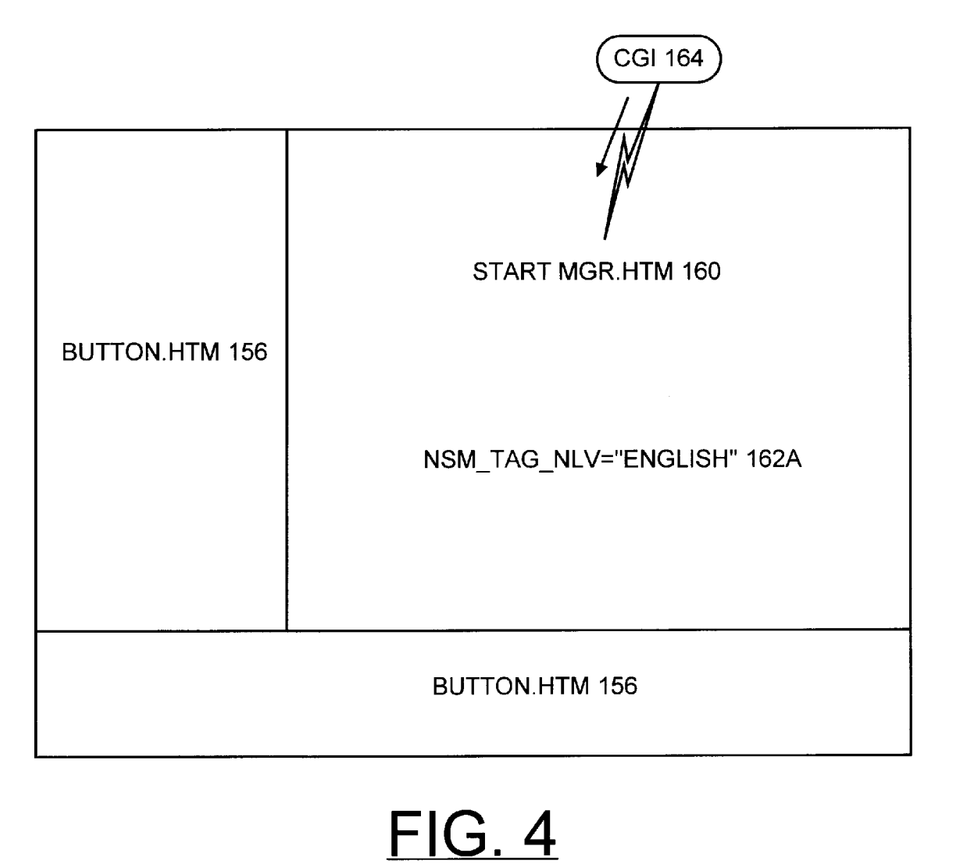

Referring also to FIG. 4, CGI program 162 determines which national language is in use on the server 110 and sends STARTMGR.HTM back to the browser with a hidden variable (NSM_TAG_NLV) 162A which has been set to the ID of a national language in use as indicated at a block 210 in FIG. 2A. For example, NSM_TAG_NLV 162A is set to English, as shown in FIG. 4.

When STARTMGR.HTM 160 is loaded again into Work Frame 226, loadlogon( ) determines that NSM_TAG_NLV has been set and calls a new function, setMRI( ) to save the value of NSM_TAG_NLV for later use. setMRI( ) also calls COPYMRI(taskFrame) which requests the web server 110 to load the appropriate national language version of MRI.HTM 162 into the Task Frame 222 as indicated at a block 212 in FIG. 2A.

Figure 5:
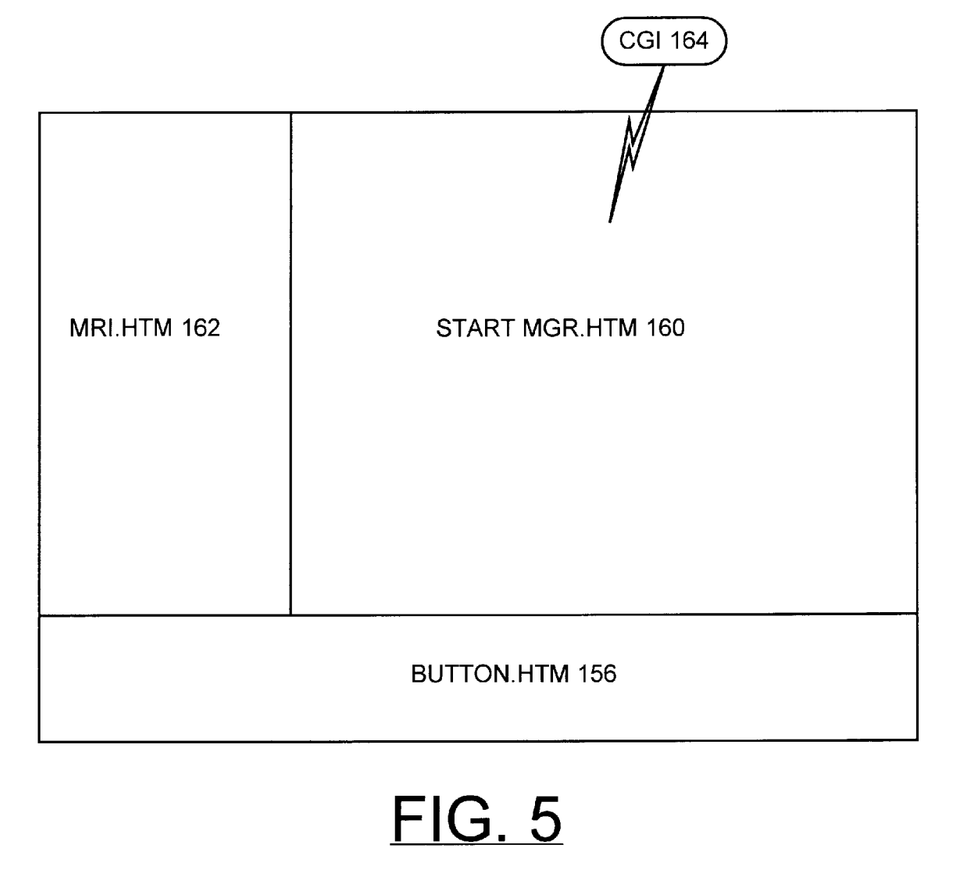

Referring to FIG. 5, MRI.HTM 162 is shown in the Task Frame 222. An exemplary excerpted version of MRI.HTM 162 as translated for U.S. English is listed in TABLE 2 below. This HTML document, MRI.HTM 162 contains string variables representing translated text used by subsequent browser script function codes that may be needed to display error messages or other text to the user. When this document is loaded into Task Frame 222, MRI.HTM 162 has no visible content. However, MRI.HTM 162 has an onLoad function, copyThisMRI( ), which copies each string into the browser's memory as indicated at a block 214 in FIG. 2A. These strings can then be used by any subsequently run JavaScript as needed. For example, in TABLE 1, a function isNumber(theElement) is used to ensure that users enter only numerals into numeric entry areas. If the function detects a non-numeral, it requests a popup error message window, using the built in JavaScript function called "alert" and puts the variable called needNumbersMsg into the window. From TABLE 2 we can see that the value of this variable in the English version of MRI.HTM is: "This value is not a positive number. Please use positive whole numbers." This illustrates the utility of separating the MRI from the JavaScript: The JavaScript function needed to know only the name of a variable—needNumbersMsg. Since there is a version of MRI.HTM for each national language, after MRI.HTM is loaded needNumbersMsg's value will be in either English, French, Italian, or other proper national language.

Figure 6:
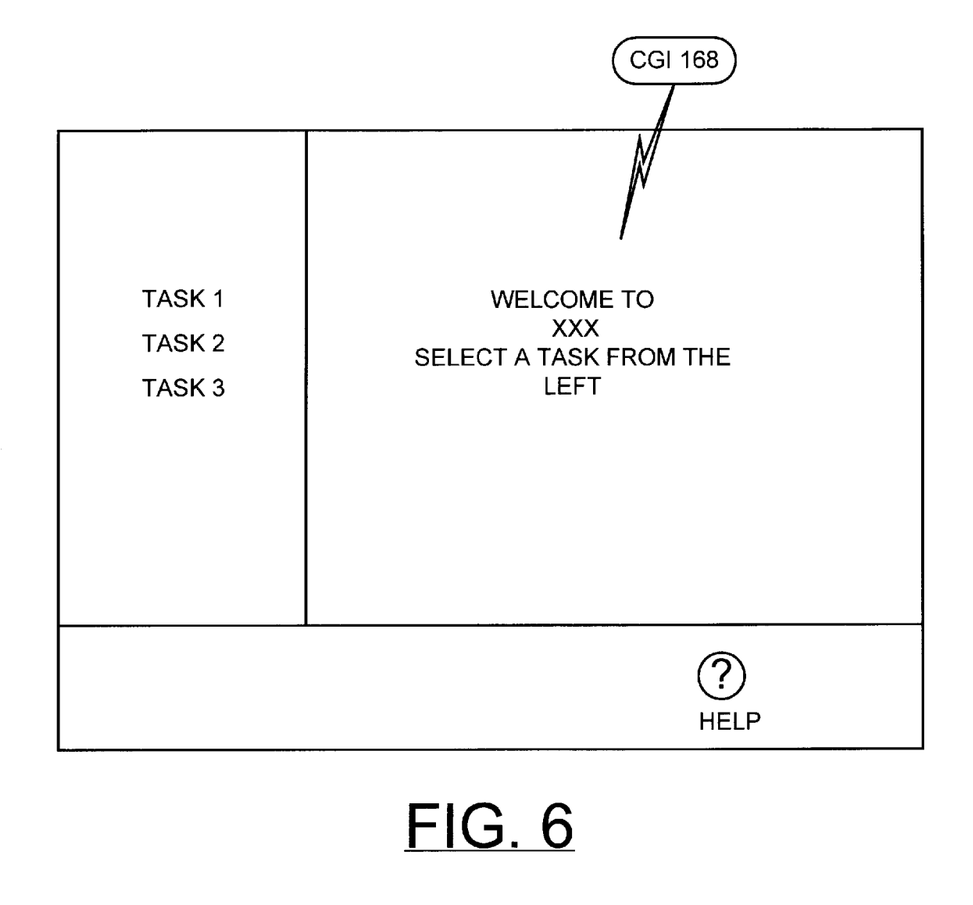

Referring to FIG. 6, the STARTMGR.HTM's JavaScript request the main panels for an application from the web server 110 to complete the startup sequence as indicated at a block 216 in FIG. 2A.

From this point on the user interface (HTML and JavaScript messages) will be displayed in the language specified by the value of NSM_TAG_NLV. This technique can be used at any time to change the national language version used for messages and text displayed by JavaScript. For example, the initial value of NSM_TAG_NLV is based on the primary language in use on the server 110, for example, German, and thus the German version of MRI.HTM is loaded. On the server 110, individual users may specify that they prefer to work in a language different from the primary one or an attribute on logon to a particular user's account may specify a different language. If a user on server 110 indicates he prefers to work in French, after signing on to the server 110, a CGI program 166 on server 110 is used to change the value of NSM_TAG_NLV from German to French. Also a JavaScript function can check for this change of the value of NSM_TAG_NLV and trigger a reload of MRI.HTM 162 in its French version as indicated at a block 218 in FIG. 2A. The user would see the initial HTML documents and JavaScript generated text in German, but after signing on he would see everything in French.

TABLE 1

Sample HTML and JavaScript for FRAMES.HTM

```
<HTML>
<HEAD>
<TITLE>Sample Frame Setting, Code-only part</TITLE>
</HEAD>
<! -- Start JavaScript section -->
<SCRIPT LANUGUAGE="JavaScript">
//COMMON VARIABLES AND SCRIPTS
startingURL=location.href
startingDir=startingURL.substring(0,
    (startingURL.lastIndexof("/")+1))
function isNumber(theElement) {
  for (var i=0; i < theElement.value.length;i++) {
    var oneChar=theElement.value.substring(i, i + 1)
    if ((oneChar < "0") || (oneChar > "9")) {
      alert (needNumbersMsg)
      return false
    }
  }
  return true
}
function setMRI(form) {
  parent.startingMRIDir=parent.startingDir +
      form.NSM_TAG_NLV.value + "/"
  copyMRI(parent.taskFrame)
}
function copyMRI(aFrame) {
  aFrame.location.href=parent.startingMRIDir + "mri.htm"
}
    . . .
//END COMMON VARIABLES AND SCRIPTS
//START SCRIPTS FOR STARTMGR
function loadLogon( ) {
  var form=parent.mainFrame.document.userForm
  if (form.NSM_TAG_NSMUSER.value=="0123456789") {
```

TABLE 1-continued

Sample HTML and JavaScript for FRAMES.HTM

```
    form.submit( )
  }
  else if (form.NSM_TAG_NSMUSER.value=="    ") {
    identifyBrowser( )
    parent.Server=form.NSM_TAG_SERVER.value
    setMRI(form)
    setTimeout("parent.mainFrame.location.href=
        parent.startingMRIDir + "logon.htm"",3000)
  }
}
//END SCRIPTS FOR STARTMGR
//START SCRIPTS FOR LOGON.HTM
function validateInput(testElement) {
  var testString=testElement.value.toUpperCase( )
  for (var i=O; i < testString.length; I++) {
    if
(validUserIdChar.indexOf(testString.charAt(i))==-1) {
      alert (badUserCharMsg)
      giveFocus(testElement)
      testElement.select( )
      return false
    }
  }
  return true
}
function subLogonFrm(form) {
  form.NSM_USERID.value=stripLeadingBlanks
    (stripTrailingBlanks(form.NSM_USERID.value))
  if (!dontAllowBlankText(form.NSM_USERID,
blankUserIDMsg))
        { return false }
  if (form.NSM_PW.value.length==O ) {
    alert (blankPWMsg)
    giveFocus (form.NSM_PW)
    return false
  }
  if (!validateInput(form.NSM_USERID))    ( return false }
  return true
}
//END SCRIPTS FOR LOGON.HTM
//START SCRIPTS FOR MAIN
    . . .
//END SCRIPTS FOR MAIN
    . . .
</SCRIPT>
<!-- End of JavaScript section -->
<!-- Frame setting HTML -->
<FRAMESET COLS="140,*" border=3>
  <FRAME SRC="button.htm" NAME="taskFrame">
  <FRAMESET ROWS ="*,65" >
    <FRAME SRC="startmgr.htm" NAME="workFrame">
    <FRAME SRC="button.htm" NAME="buttonFrame">
  </FRAMESET>
</FRAMESET>
</HTML>
```

TABLE 2

Sample HTML and JavaScript for MRI.HTM (U.S. English version)

```
<HTML>
<HEAD>
<TITLE>MRI Document</TITLE>
<SCRIPT LANGUAGE="JavaScript">
function copyThisMRI( ) {
  // COMMON Messages
  parent.noChangedUserMsg="To change user defaults, you
      must have a user selected."
  parent.noCreatedUserMsg="To create defaults for a new
      user, you must enter a user ID."
  parent.needNumbersMsq="This value is not a positive
      number. Please use positive whole numbers."
  // STARTMGR.HTM Messages
  parent.unexpectedMsg="An expected value was received
      from the logon program."
```

TABLE 2-continued

Sample HTML and JavaScript for MRI.HTM (U.S. English version)

```
  parent.noLogonWiniMsg="The program was unable to open a
    logon window, possibly because there wasn't
    enough memory. Close other programs that are
    running, and reload the program."
  parent.wrongJavaScriptVersionMsg="To run the program
    with Netscape you must use version 3.0 or later.
    You have version "
  // LOGON.HTM Messages
  parent.blankUserIDMsg="Please enter a user ID."
  parent.blankPWMsg="Please enter a password."
  parent.badUserCharMsg="A character you typed for User
    is not allowed.\n\nValid characters are the letters
    from A–Z, digits from 0–9, and @, _, #, and $."
}
  . . .
</SCRIPT>
<BODY BGCOLOR="#FFFFFF" onLoad="copyThisMRI ( )">
</BODY>
</HTML>
```

Figure 7:
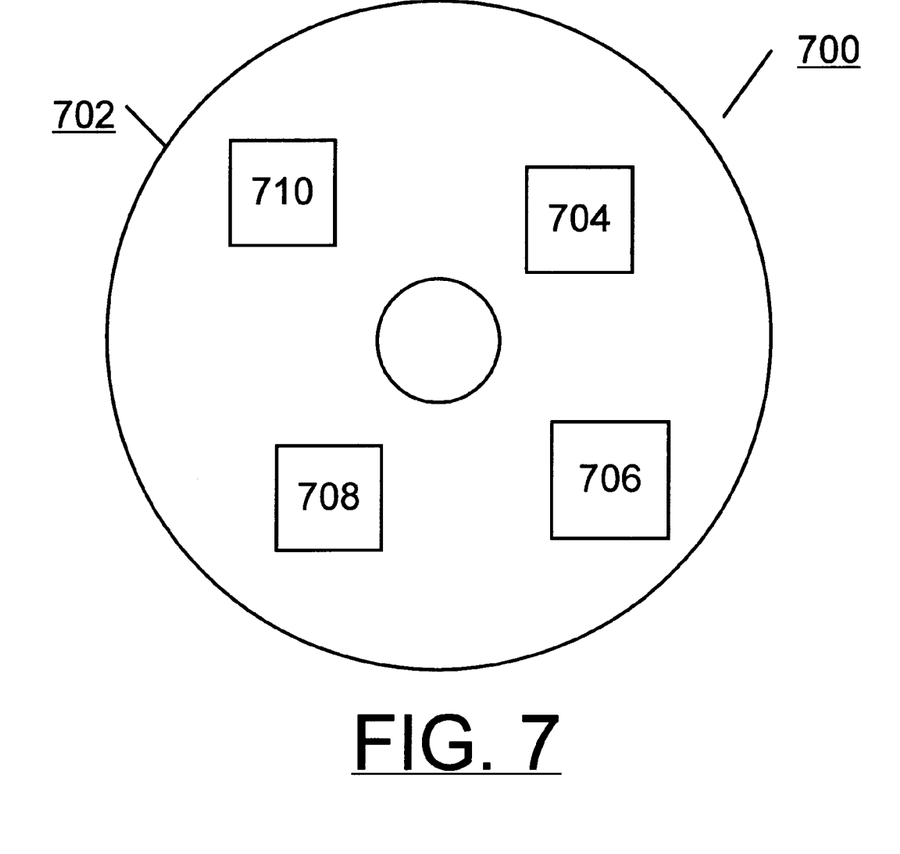
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods of this invention in the system 100 of FIGS. 1A and 1B.

A sequence of program instructions or a logical assembly of one or more interrelated modules defined by the recorded program means 704, 706, 708, 710, direct the computer 102 to perform the translation material or MRI extraction method of the invention.

While the present invention has been described with reference to the details of the embodiments of the invention shown in the drawing, these details are not intended to limit the scope of the invention as claimed in the appended claims.

What is claimed is:

1. A browser computer program product for extracting translatable material or Machine Readable Information (MRI) from browser program function codes in a computer system comprising:

a recording medium;

means, recorded on the recording medium, for partitioning a browser window into frames; said browser window frames including a parent frame; and means, recorded on the recording medium, for calling an MRI load function for creating a plurality of variables in said parent frame, each of said plurality of variables defining a MRI string; said calling means including means, recorded on the recording medium, for identifying a national language in use; and means, recorded on the recording medium, responsive to an identified national language for storing a corresponding national language MRI string for each of said plurality of variables.

2. A browser computer program product for extracting translatable material or Machine Readable Information (MRI) from browser program function codes as recited in claim 1 wherein said means, recorded on the recording medium, for partitioning said browser window into frames include means, recorded on the recording medium, for invoking a uniform resource locator (URL) for loading a FRAMES Hypertext Markup Language (HTML) document.

3. A browser computer program product for extracting translatable material or Machine Readable Information (MRI) from browser program function codes in a computer system comprising:

a recording medium;

means, recorded on the recording medium, for partitioning a browser window into frames; said browser window frames including a parent frame;

means, recorded on the recording medium, for calling an MRI load function for creating a plurality of variables in said parent frame, each of said plurality of variables defining a MRI string; and means, recorded on the recording medium, for using said variables in the browser program function codes for displaying MRI.

4. A browser method for extracting translatable material or Machine Readable Information (MRI) from browser program function codes in a computer system comprising the steps of:

partitioning a browser window into frames; said browser window frames including a parent frame; and creating a plurality of variables in said parent frame, each of said plurality of variables defining a MRI string including the steps of calling an MRI load function for creating a plurality of variables in said parent frame, identifying a national language in use and storing a corresponding national language MRI string for each of said plurality of variables; and using said variables in the browser program function codes for displaying MRI.

5. A browser method for extracting translatable material or Machine Readable Information (MRI) from browser program function codes as recited in claim 4 further includes the steps of identifying a user selected different national language for use and storing a corresponding national language MRI string for each of said plurality of variables.

6. A browser method for extracting translatable material or Machine Readable Information (MRI) from browser program function codes as recited in claim 4 wherein the step of partitioning a browser window into frames includes the steps of invoking a uniform resource locator (URL) and loading a predefined FRAMES Hypertext Markup Language (HTML) document.

7. A computer system having apparatus for browser apparatus for extracting translatable material or Machine Readable Information (MRI) from browser program function codes comprising:

a processor;

a memory;

a communications adapter;

a bus connecting said processor, memory, and communications adapter;

means for partitioning a browser window into frames; said browser window frames including a parent frame;

means for calling an MRI load function for creating a plurality of variables in said parent frame, each of said plurality of variables defining an MRI string;

means for identifying a national language in use and means for storing a corresponding national language MRI string for each of said plurality of variables.

* * * * *